April 1, 1930.

E. T. WILLIAMS

REFRIGERATING APPARATUS

Re. 17,635

Original Filed July 11, 1925

Inventor
Edward T. Williams.
By his Attorneys.
Cooper, Kerr & Dunham.

Reissued Apr. 1, 1930

Re. 17,635

UNITED STATES PATENT OFFICE

EDWARD T. WILLIAMS, OF PELHAM MANOR, NEW YORK, ASSIGNOR TO FEDDERS MANUFACTURING COMPANY, INC., OF BUFFALO, NEW YORK, A CORPORATION OF NEW YORK

REFRIGERATING APPARATUS

Original No. 1,645,314, dated October 11, 1927, Serial No. 42,866, filed July 11, 1925. Application for reissue filed April 22, 1929. Serial No. 357,255.

In some refrigerating systems lubricant from the interior of the compressor passes through the condenser into the expansion chamber, and, if allowed to accumulate therein, seriously impairs the efficiency of the apparatus. In so-called "flooded" systems, in which a body of liquid refrigerant is maintained in the expansion chamber or coils, it has been proposed to use a lubricant which is lighter than the liquid refrigerant, so that it will float on the latter, but if allowed to accumulate thereon it interferes with the operation of the float valve which is intended to keep the liquid refrigerant constant in volume. I have accordingly been led to devise my present invention, which has for its object to provide simple but thoroughly effective means for removing the lubricant. To this and other ends the invention consists in the novel features and combinations hereinafter described.

Figure 1:
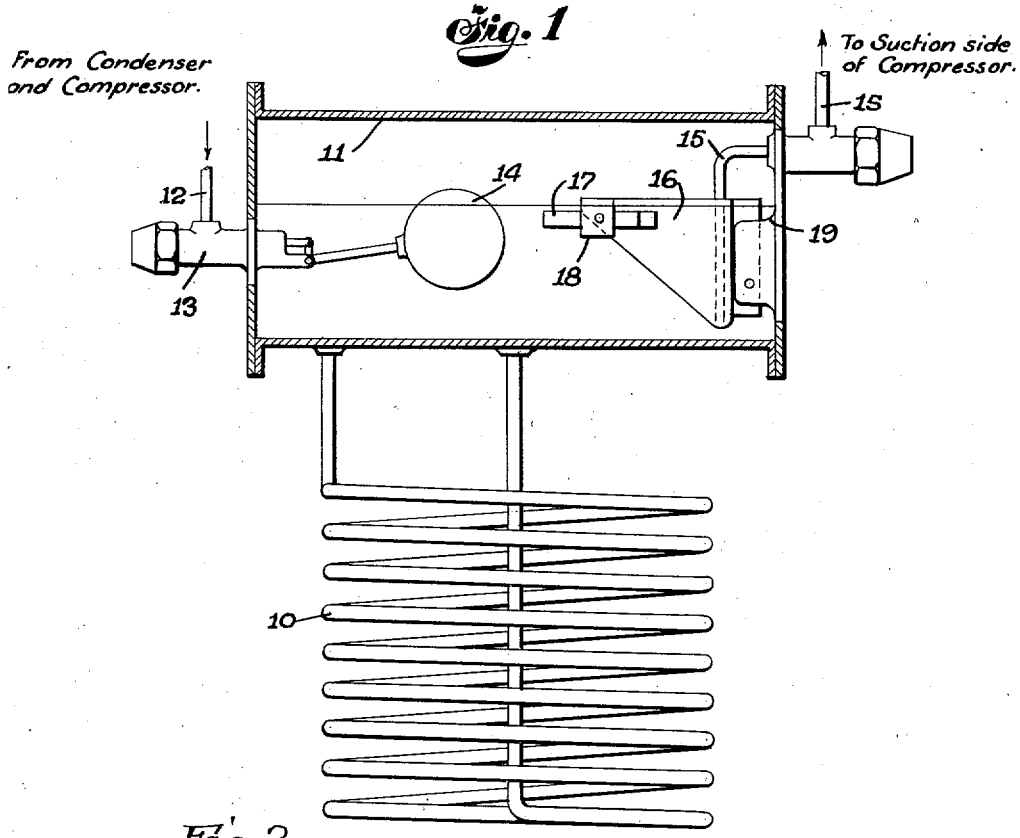

Referring to the accompanying drawings, Fig. 1 illustrates the preferred form of my invention in vertical section.

Figure 2:
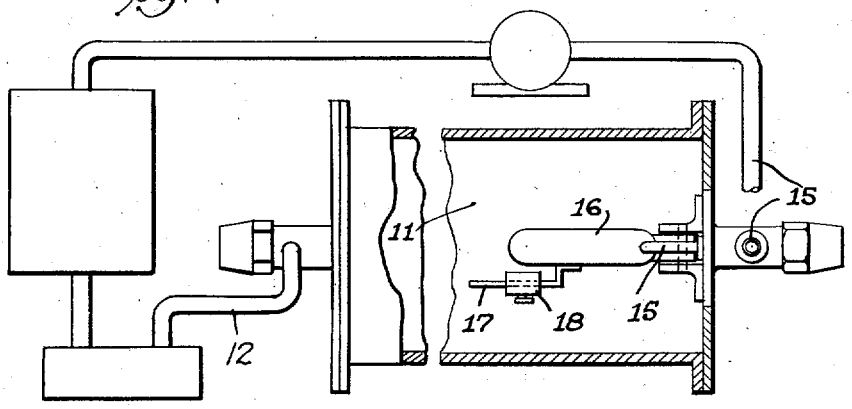

Fig. 2 is a detail sectional plan view.

In the system illustrated, the expansion coils 10 receive liquid refrigerant from a chamber 11 which in turn receives liquid refrigerant through pipe 12 from the condenser and compressor, not shown. The outlet of the refrigerant supply pipe 12 is controlled by a valve 13 which is itself operated by a float 14, in the usual manner, to maintain a constant liquid-level in the chamber, as will readily be understood. As the refrigerant is evaporated, the vapor collects in the chamber 11 and is led back to the suction or low pressure side of the compressor by a pipe 15.

If the lubricant passing to the chamber 11 and floating on the refrigerant therein is not removed it will, since it is non-volatile, displace more or less of the refrigerant, thus impairing the efficiency of the apparatus as well as robbing the compressor of lubricant.

In accordance with my present invention I prevent this accumulation, by removing the lubricant as fast as it enters the chamber. For this purpose I provide a floating skimmer, light enough to float in the refrigerant but too heavy to float in the lubricant. In its preferred form the skimmer is a narrow, open-topped vessel of triangular form 16, pivoted at one end near its bottom, and having an arm 17 carrying an adjustable weight 18 by which the buoyancy of the chamber can be regulated as desired. The pipe 15 is extended into the skimmer to a point near its bottom, as shown.

As before stated, the float 14 maintains the surface of the liquid at a constant height. If a part of the liquid is a floating layer of oil, it is clear that as the oil increases in depth, the surface of the refrigerant descends. But as the refrigerant level falls, the buoyant effect on the skimmer is decreased. As a result the latter swings down with the result that the floating oil pours over its edge, and, submerging the intake orifice of pipe 15, is sucked back to the compressor. The draining of the floating oil or other lubricant into the skimmer lowers the liquid level in chamber 11, whereupon the float 14 falls, admitting liquid refrigerant until the latter rises high enough to raise the skimmer out of the remaining layer or film of oil. If, at this stage, the float 14 has not risen far enough to close valve 13, the refrigerant in the chamber will continue to rise until valve 13 is closed, but at no time can refrigerant overflow into the skimmer in any material amount since the skimmer always floats with its edge slightly above the surface of the refrigerant. On the other hand, a slight increase in the thickness of the lubricant layer will cause the latter to overflow into the skimmer and be sucked back to the compressor. Hence the lubricant cannot accumulate beyond a certain amount, which can be made practically as small as desired by proper design and adjustment of the parts. A stop 19 may be provided to limit the upward swing of the skimmer, preferably so located as to arrest the skimmer at the moment the float valve closes. This prevents the skimmer from ever rising too high to receive floating lubricant and hence insures that the latter cannot accumulate unduly.

As previously related, the refrigerant vapor collects above the refrigerant level in the evaporator or chamber 11 and is sucked back to the compressor through the pipe 15, and it therefore is apparent that refrigerant in moving to the pipe 15 must first move down into the open-topped vessel 16. This vessel, in addition to collecting and controlling the oil in the evaporator, also provides a shielded zone around the open end of the outlet pipe. Thus, a circuitous route, partially through a zone shielded from free liquid refrigerant particles suspended in the evaporator, is traveled by refrigerant when leaving the evaporator, and such route allows time for vaporization of substantially all liquid refrigerant particles traveling with the vaporized refrigerant prior to their entrance into the pipe 15, and vaporization of liquid refrigerant in the pipe is substantially eliminated.

It is to be understood that the invention is not limited to the specific devices herein illustrated and described but can be embodied in other forms without departing from its spirit.

I claim—

1. In a refrigerating system having a compressor, the combination with a chamber for liquid refrigerant, and means for maintaining a constant liquid level therein, of a skimmer floating in the liquid refrigerant to receive lubricant floating on the refrigerant, and means for removing the lubricant from the skimmer, and delivering the same to the compressor.

2. In a refrigerating system having a compressor, the combination with a chamber for liquid refrigerant, and means for maintaining a constant liquid level therein, of a pivoted skimmer floating in the refrigerant to receive lubricant from the surface of the refrigerant, and means for removing the lubricant from the skimmer, and delivering the same to the compressor.

3. In a refrigerating system having a compressor, the combination with a chamber for liquid refrigerant, and means for maintaining a constant liquid level therein, of a floating skimmer in the chamber, to receive lubricant from the surface of the refrigerant, the skimmer being heavier than the lubricant but lighter than the refrigerant, and means for removing the lubricant from the skimmer and evaporated refrigerant from the chamber and delivering both to the compressor.

4. In a refrigerating system having a compressor, the combination with a chamber for liquid refrigerant, of a floating open-topped vessel for skimming lubricant from the surface of the refrigerant, said vessel being lighter than the refrigerant but heavier than the lubricant, and means for removing the lubricant from the vessel, and delivering the same to the compressor.

5. In a refrigerating system, the combination with a chamber for liquid refrigerant, of means for removing lubricant from the surface of the refrigerant, comprising an open-topped vessel adapted to float with its edge above the surface of the refrigerant, but too heavy to float in the lubricant, and a suction pipe extending into the vessel adjacent to the bottom thereof for withdrawing lubricant therefrom.

6. In a refrigerating system having a compressor, the combination with a chamber for liquid refrigerant, and means for maintaining a constant liquid level therein, of a skimmer floating in the liquid refrigerant to receive lubricant floating on the refrigerant, and means for conducting the lubricant from the skimmer.

7. In a refrigerating system having a compressor, the combination with a chamber for liquid refrigerant, and means for maintaining a constant liquid level therein, of a pivoted skimmer floating in the refrigerant to receive lubricant from the surface of the refrigerant, and outlet means for permitting removal of the lubricant from the skimmer.

8. In a refrigerating system having a compressor, the combination with a chamber for liquid refrigerant, and means for maintaining a constant liquid level therein, of a floating skimmer in the chamber, to receive lubricant from the surface of the refrigerant, the skimmer being heavier than the lubricant but lighter than the refrigerant, and means for conducting the lubricant from the skimmer.

9. In a refrigerating system of the compressor-condenser-evaporator type through which oil and refrigerant of different specific gravities travel in cycle, the method of controlling the relation of the oil and refrigerant in their travel through the low pressure side of the system, comprising admitting oil and refrigerant in a definite proportion into a single accumulation in the evaporator to maintain a substantially constant quantity therein, collecting oil from the accumulation in the same proportion as admitted, and returning to the compressor the gasefied refrigerant together with the collected oil to maintain constant amounts of refrigerant and oil in said accumulation.

10. In a refrigerating system of the compressor-condenser-evaporator type through which a body of refrigerant and oil, of lower specific gravity than said refrigerant, travels in cycle, the method of controlling the relation of the refrigerant and oil within the evaporator which comprises admitting to the evaporator sufficient oil and refrigerant to maintain substantially constant the liquid quantity therein, and removing oil from the evaporator by suction as required to maintain a substantially constant quantity of oil and refrigerant in the evaporator.

11. In a refrigerating system of the compressor-condenser-evaporator type through which oil and refrigerant of different specific gravities travel in cycle, the method of controlling the relation of the oil and refrigerant in their travel through the low pressure side of the system, comprising automatically admitting oil and refrigerant into the evaporator as required to maintain a constant quantity of liquid refrigerant therein, and automatically removing oil as it accumulates above the level of the refrigerant and gasified refrigerant from the evaporator.

12. In a refrigerating system of the compressor-condenser-evaporator type through which oil and refrigerant of different specific gravities travel in cycle, the method of controlling the relation of the oil and the refrigerant in their travel through the low pressure side of the system, comprising admitting oil and refrigerant into a single accumulation in the evaporator as required to maintain a constant quantity of liquid refrigerant therein, gathering oil rising above the refrigerant level within the evaporator, and removing the gathered oil and gasified refrigerant from the evaporator.

13. In a mechanical refrigerating system of the compressor-condenser-evaporator type through which oil and refrigerant travel in cycle, the method of controlling the passage of the oil and the refrigerant in their travel through the low pressure side of the system, comprising admitting oil and refrigerant into a single accumulation in the evaporator to maintain a substantially constant quantity therein, collecting free liquid refrigerant and oil from the accumulation, and removing from the evaporator collected oil and gasified refrigerant.

14. In a mechanical refrigerating system, a fluid circulating within the system composed of liquid refrigerant and oil of relatively different specific gravities and adapted to separate by gravity, an evaporator having an inlet and adapted to retain an accumulation of liquid refrigerant and oil, automatic control means for admitting the refrigerant and oil to the evaporator to maintain substantially constant the level of the liquid refrigerant in the evaporator, means for removing oil from the accumulation as it separates by gravitation, and means for removing the separated oil and gasified refrigerant from the evaporator.

15. In a mechanical refrigerating system, a fluid circulating within the system composed of liquid refrigerant and oil of relatively different specific gravities and adapted to separate by gravity, an evaporator having inlet means and adapted to retain an accumulation of liquid refrigerant and oil, automatic means for admitting refrigerant and oil to the evaporator to maintain substantially constant the level of the refrigerant within the evaporator, means in the evaporator for collecting oil rising above the accumulation level, and means for removing the collected oil and gasified refrigerant from the evaporator.

16. In mechanical refrigerating systems, a fluid circulating within the system comprising liquid refrigerant and oil of relatively different specific gravities and adapted to separate by gravity, an evaporator having an inlet and adapted to retain an accumulation of refrigerant and oil, automatic control means for admitting the refrigerant and oil to the evaporator to maintain substantially constant the level of the refrigerant within the evaporator, a vessel floating in the accumulation in the evaporator for collecting oil separating by gravity, and means for removing the collected oil and gasified refrigerant from the evaporator.

17. In a mechanical refrigerating system, a fluid circulating within the system comprising liquid refrigerant and oil of relatively different specific gravities and adapted to separate by gravitation, an evaporator having an inlet and adapted to retain an accumulation of refrigerant and oil, automatic control means for admitting the refrigerant and oil to the evaporator to maintain substantially constant the level of the refrigerant within the evaporator, a vessel within the evaporator for collecting oil separating by gravitation from the accumulation therein, and means for removing the gasified refrigerant and the oil in the vessel from the evaporator.

18. In a mechanical refrigerating system, a fluid circulating within said system comprising liquid refrigerant and oil of relatively different specific gravities and adapted to separate by gravitation, an evaporator having an inlet and adapted to retain an accumulation of refrigerant and oil, automatic control means for admitting the refrigerant and oil to the evaporator to maintain substantially constant the level of the refrigerant within the evaporator, means for removing oil from the accumulation as it separates by gravitation, and suction means for removing the separated oil and gasified refrigerant from the evaporator.

19. In a mechanical refrigerating system, a fluid circulating within the system comprising liquid refrigerant and oil of relatively different specific gravities and adapted to separate by gravitation, an evaporator having an inlet and adapted to retain an accumulation of refrigerant and oil, automatic control means for admitting the refrigerant and oil to the evaporator to maintain substantially constant the level of the refrigerant within the evaporator, means in the evaporator collecting oil as it rises above the refrigerant level in the accumulation, and suction means for removing the collected oil and gasified refrigerant from the evaporator.

20. In a mechanical refrigerating system, a fluid circulating within the system comprising liquid refrigerant and oil of relatively different specific gravities and adapted to separate by gravitation, an evaporator having an inlet and adapted to retain an accumulation of refrigerant and oil, automatic control means for admitting the refrigerant and oil to the evaporator to maintain substantially constant the level of the refrigerant within the evaporator, a vessel floating in the accumulation in the evaporator for collecting oil separating from the accumulation by gravitation, and suction means communicating with the vessel for removing the collected oil and gasified refrigerant from the evaporator.

21. In a mechanical refrigerating system, of the compressor-condenser-evaporator type, in which refrigerant and oil circulate together in cycle, an evaporator, in which a constant quantity of liquid refrigerant and oil are retained in a single accumulation, and an outlet conduit leading to the compressor and extending into the evaporator in relation to the fluid accumulation to permit the compressor to withdraw both oil and gasified refrigerant from the evaporator by suction.

22. In a mechanical refrigerating system, a fluid circulating within the system comprising liquid refrigerant and oil of relatively different specific gravities and adapted to separate by gravitation, an evaporator having an inlet and adapted to retain a single accumulation of refrigerant and oil, automatic control means for admitting the refrigerant and oil to the evaporator to maintain constant the level of the refrigerant within the evaporator, a vessel in the evaporator for collecting oil separating by gravitation from the accumulation, and a tube depending into the vessel through which the oil therein and gasified refrigerant are removed from the evaporator.

23. In a mechanical refrigerating system, an evaporator having a refrigerant inlet opening and adapted to contain a body of liquid refrigerant and oil adapted to separate by gravitation, a tube extending into said evaporator and provided with an opening therein for producing oil and gasified refrigerant therefrom, and means for maintaining the tube opening in a plane below the liquid body in a segregated zone.

24. In mechanical refrigerating system of the compressor-condenser-evaporator type, in which refrigerant travels in a cycle, the method of controlling the refrigerant in the low pressure side comprising, maintaining a substantially constant body of liquid refrigerant in the evaporator, and removing the refrigerant separating from and rising above the liquid body through a shielded zone in the evaporator influencing vaporization of liquid particles, and removing the gasified refrigerant from the shielded zone to the exterior of the evaporator.

25. In a mechanical refrigerating system of the compressor-condenser-evaporator type through which refrigerant travels in a cycle, the method of controlling the refrigerant in the low pressure side of the system comprising maintaining a substantially constant body of liquid refrigerant in the evaporator, and removing suspended refrigerant rising above the liquid body in a sinuous route through the evaporator substantially shielded from any liquid refrigerant in suspension.

26. In a mechanical refrigerating system in which refrigerant travels in cycle, an evaporator, means for admitting refrigerant into the evaporator to maintain a substantially constant liquid body therein, an outlet tube for the refrigerant projecting into the evaporator, and means within the evaporator substantially enclosing the mouth of the outlet tube from the liquid refrigerant.

27. In a mechanical refrigerating system in which refrigerant travels in cycle, an evaporator in which a body of liquid refrigerant is maintained, an outlet tube projecting into the evaporator for the gasified refrigerant, and means providing a shielded zone around the outlet tube in which liquid refrigerant in suspension passes before entering the outlet tube.

28. In a mechanical refrigerating system in which refrigerant travels in cycle, an evaporator in which a body of liquid refrigerant is maintained, a vessel in the evaporator communicating with the space in the evaporator above the liquid body, and a refrigerant outlet tube extending downwardly into the vessel.

29. In a mechanical refrigerating system in which refrigerant travels in cycle, an evaporator in which a substantially constant body of liquid refrigerant is maintained, a vessel in the evaporator floating in the liquid body and communicating with the space above the liquid refrigerant, and an outlet tube extending into the vessel.

30. In a refrigerating system of the compressor - condenser-flooded-evaporator type through which oil and refrigerant travel in cycle, the evaporator having an open-topped floating vessel therein, the method of controlling the relation of the oil and the refrigerant in their travel through the evaporator, comprising moving oil gathering on top of the liquid refrigerant in the evaporator over the edge of the vessel, and removing oil in the vessel and vaporized refrigerant from the evaporator.

31. In a mechanical refrigerating system in which oil and refrigerant travel in cycle, an evaporator in which a substantially constant body of liquid refrigerant is maintained, an open-topped vessel within the evaporator and pivoted therein at one end to float on the body of refrigerant, the oil accumulating on the body of refrigerant moving over the edge of the vessel, and an outlet tube for the oil and refrigerant extending into the vessel and exteriorly of the evaporator.

32. In a mechanical refrigerating system, a stationarily mounted evaporator having an outlet, and an inlet means for admitting liquid refrigerant and oil, a fluid disposed within said evaporator comprising liquid refrigerant and oil of relatively different specific gravities, and automatic control means for maintaining a substantially constant quantity of refrigerant and oil in a constant proportion within the evaporator.

33. In a refrigerating system of the compressor-condenser-evaporator type through which oil and refrigerant of different specific gravities travel in cycle, the method of controlling the relation of the oil and refrigerant in their travel through the low pressure side of the system comprising automatically admitting oil and refrigerant into a single accumulation in the evaporator as required to maintain a substantially constant quantity therein, then causing separation of the refrigerant from the accumulation by vaporization, and then returning to the compressor the vaporized refrigerant and oil in the same proportion as admitted with the evaporated refrigerant.

34. In a mechanical refrigerating system of the compressor-condenser-evaporator type through which refrigerant circulates in cycle, the method of controlling the refrigerant in the evaporator chamber, comprising maintaining a body of liquid refrigerant in the evaporator chamber, vaporizing liquid refrigerant in the evaporator chamber and causing gasified refrigerant and liquid refrigerant particles to rise above the body in the chamber, creating a suction to withdraw the vaporized refrigerant in the space above the body from the evaporator chamber, and causing the liquid refrigerant particles moving with the outgoing gasified refrigerant to travel through a zone in the evaporator chamber so that they completely vaporize before leaving the evaporator.

In testimony whereof, I have hereunto subscribed my name this 15th day of April, 1929.

EDWARD T. WILLIAMS.